United States Patent [19]
Isreeli et al.

[11] 3,749,113
[45] July 31, 1973

[54] FLOW REGULATOR FOR CONTROLLING ULTRA-LOW VOLUMETRIC FLOW RATES

[75] Inventors: Jack Isreeli, Mamaroneck; Aaron Kassel, Tarrytown; Edwin H. Mernyk, Brunswick, all of N.J.

[73] Assignee: Technician Instruments Corporation, Tarrytown, N.Y.

[22] Filed: Sept. 14, 1970

[21] Appl. No.: 71,699

[52] U.S. Cl................ 137/209, 137/501, 137/510
[51] Int. Cl............................................. F04f 1/06
[58] Field of Search................... 137/501, 510, 209

[56] References Cited
UNITED STATES PATENTS

| | | | |
|---|---|---|---|
| 2,742,764 | 4/1956 | St. Clair | 137/501 X |
| 2,696,831 | 12/1954 | Malick | 137/501 X |
| 1,887,322 | 11/1932 | Nettelton | 137/82 |
| 2,154,223 | 4/1939 | Wade | 137/501 X |
| 3,593,738 | 7/1971 | Baerfuss | 137/209 |
| 3,520,312 | 7/1970 | Ackerman | 137/4 |
| 3,392,752 | 7/1968 | Iozzi | 137/501 |

*Primary Examiner*—Alan Cohan
*Attorney*—S. P. Tedesco

[57] ABSTRACT

A flow regulator for ultra-low volumetric flow rates is described having excellent self-purging and self-cleaning characteristics, wherein the valve assembly, or control seat, is formed in elongated fashion and supported in frictionless manner at, at least, two points along its length to insure positional stability.

4 Claims, 2 Drawing Figures

INVENTOR.
JACK ISREELI
AARON KASSEL
EDWIN H. MERNYK

ATTORNEY

FLOW REGULATOR FOR CONTROLLING ULTRA-LOW VOLUMETRIC FLOW RATES

BACKGROUND OF THE INVENTION

1. Field of the Invention

This invention relates to a flow regulator structure capable of accurate regulation of ultra-low volumetric flow rates of gases or liquids.

2. Description of the Prior Art

The provision of continuous and precisely controlled flow of fluids is not only desirable but essential in many applications. For example, in "continuous-flow" analytical systems, for example, as described in U. S. Pat. No. 2,797,149, issued on June 25, 1957, and in U. S. Pat. No. 3,241,432, issued on Mar. 22, 1966, a plurality of discrete liquid samples are transmitted successively as a stream along a conduit system and chemically reacted in transit, so as to effect analysis of a particular constituent of interest. Such reaction is effected by properly proportioning the volumetric flow rate at which the particular reagent is introduced into the conduit system with respect to the volumetric flow rate of the sample to be reacted. A proper proportioning of the sample and reagent is critical, so as to insure an accurate analysis of the concentration of the particular constituent of interest.

In "continuous-flow" analytical systems, peristaltic-type pumps are usually employed to propel the various fluids along the conduit system, i.e., sample liquid, reagent, etc. A suitable peristaltic-type pump has been described, for example, in U. S. Pat. No. 2,935,028, issued on May 3, 1960, wherein successive rollers occlude each of a plurality of pump tubes concurrently, the relative proportions of the various fluids introduced into the conduit system determined by the respective cross-sections, i.e., capacities, of the corresponding pump tubes.

Peristaltic pumping of fluids, either gaseous or liquid, is objectionable because of the pulsatile flow inherent in peristaltic-type pumps, the unavailability of pump tubes which are inert to all chemicals, and the tendency of pump tube capacity to vary with use. This is particularly true when very low volumetric flow rates are to be pumped. Alternative pump structures are available which are not inherently pulsatile, but which do have their own peculiar limitations. One such alternative structure is a multiple-piston pump, wherein each piston is driven by its own cam, and the family of cams are designed to produce a total constant flow. Such multiple-piston pumps, however, are expensive and mechanically complicated, and are susceptible to frequent malfunctions. Another alternative pump structure, for example, has been described in U. S. patent application Ser. No. 712,431, filed on Mar. 13, 1968 (Docket 1303), now abandoned which show the use of a "pressure-pumping" technique in "continuous-flow" analytical systems. Essentially, such "pressure-pumping" technique provides that gas under a controlled-constant pressure is introduced into a sealed liquid container, so as to propel such liquid from the container. Liquid propelled from the container is initially passed through a temperature-compensated high-resistance coil prior to being introduced along analytical system, which exhibits a total flow resistance which is substantially less than that of the resistance coil. Accordingly, any transient variations in the flow resistance along the analytical system has only a minimal effect on volumetric flow rate, which is determined primarily by the high-resistance coil. In such systems, however, to control liquid flow to good accuracy, the operating pressure drop in the control resistance must be high, which requires a long resistance coil with relatively high volume. Accordingly, the "start-up" time of the analytical system is of considerable duration, and the self-purging and self-cleansing characteristics are not optimum. Such prior art analytical systems do not have the inherent capability of compensating for any such variation to achieve a constant volumetric flow rate, which is essential to insure complete accuracy of the analytical results.

OBJECTS OF THE INVENTION

Accordingly, an object of this invention is to provide flow regulator which is effective to precisely control ultralow volumetric flow rates of a gas or liquid.

Another object of this invention is to provide a flow regulator which is of relatively simple and inexpensive construction.

Another object of this invention, is to provide a flow regulator which is capable of extreme accuracy over a wide range of ambient and system variations.

Another object of this invention is to provide a flow regulator having a very low operating-pressure drop, i.e. of one-half and less.

A still further object of this invention is to provide a flow regulator which has an extremely short response time.

An additional object of this invention is to provide a flow regulator having improved self-purging and self-cleansing characteristics.

A still further object of this invention is to provide a flow regulator which can reliably control volumetric flow rates substantially less than 0.1 ml/min, with better than ± 1 percent accuracy.

SUMMARY OF THE INVENTION

These and other objects and advantages of this invention are achieved by providing a positive and frictionless guiding of a floating valve assembly, which insures a proper motion between the control tube and control seat. In prior art flow regulators, particularly those intended for controlling very small volumetric flow rates, e.g. less than 0.1 ml/min, improper motion of control seat, e.g. lack of positional stability, made precise regulation substantially impossible. In accordance with a particular feature of this invention, the valve assembly carrying the control seat is provided positional stability and positively guided to insure accurate motion between the control tube and control seat. Such feature is achieved by forming the valve assembly in elongated fashion, and supporting such assembly at, at least, two points along its length, so as to allow movement only along a single axis. As described, the elongated valve assembly is supported in a frictionless manner within a main housing member by a pair of diaphragms. The diaphragms are located in substantially parallel planes and define, in effect, three distinct chambers within the main housing, i.e., a reagent input chamber a reagent output chamber, and an intermediate chamber. The reagent input and output chambers are interconnected along a high-resistance coil, which creates a pressure differential $\Delta P$ between such chambers, which varies as a function of the volumetric flow rate Q through the resistance coil. Preferably, the flow regulator is contained in a controlled-temperature path so as to maintain the viscosity of the fluid constant. A control spring is located within the intermediate chamber to provide a reference pressure $P_R$, tending to displace the control tube from the control seat, which is opposed by such pressure differential $\Delta P$, such that the spacing between the control tube and control seat is determined to provide a predetermined flow rate. The provision of distinct and unobstructed reagent input and output chambers allows for good self-purging characteristics and good wash-out characteristcs, which are highly desirable in "continuous-flow" analytical systems, and there is no "dead-end" stagnation in the flow regulator structure. Also, the intermediate chamber is pressurized to the same pressure as the reagent inlet chamber, to allow for the use of thin, chemically resistant, negligible hysteresis, very flexible membranes. As such, the valve assembly is supported in a floating state, so as to respond immediately to any change in the pressure differential $\Delta P$ across the resistance coil. Preferably, the intermediate chamber is pressurized at a same pressure as is the reagent inlet chamber. In the described embodiment, the intermediate chamber is connected to a same source of pressurized gas as is used to propel the reagent from a sealed container and through the flow regulator into the conduit system. Accordingly, the pressure differential $\Delta P$ developed across the high-resistance coil is, in effect, applied only across the diaphragm defining the reagent outlet chamber, whereby any in the respective effective areas of the diaphragms resulting from manufacturing tolerances, is avoided.

In an alternate embodiment, the diaphragm defining the reagent inlet chamber is replaced, for example, by a spider-like structure which cooperates with the diaphragm defining the reagent outlet chamber to provide positional stability to and positively guide the valve assembly. In such event, the fluid whose volumetric flow rate is being controlled is passed directly through the high-resistance coil and the reagent outlet chamber into the conduit system. In effect, a two-chambered structure is defined, the chamber containing the spider-like structure being pressurized at a fixed pressure by connection to the same source of gas pressure used to propel the reagent through the conduit system, so as to again avoid any "dead-end" stagnation of liquid in the flow regulator structure and to further improve the good self-purging and wash-out characteristics.

DETAILED DESCRIPTION OF THE INVENTION

Figure 1:
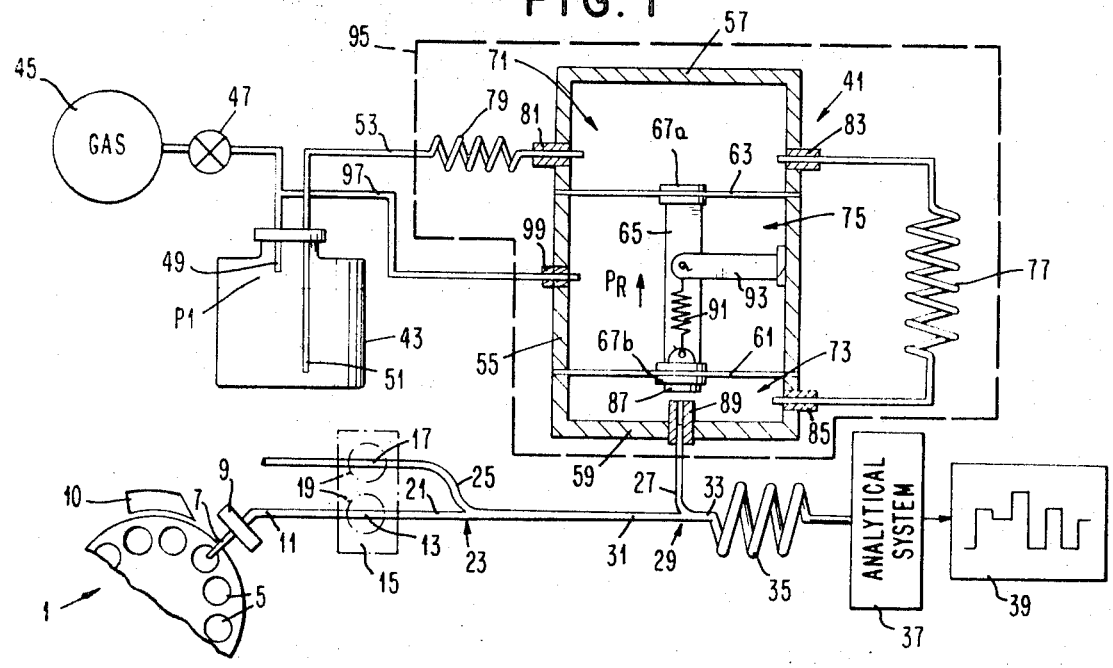
FIG. 1 is a schematic diagram of a "continuous-flow" analytical system incorporating a flow regulator according to the present invention, such regulator being shown in cross-section.

FIG. 1 illustrates the use of the flow regulator, or control, of the present invention in a "continuous-flow" analytical system of the type described in the above-identified U. S. patent application Ser. No. 712,431 for analyzing of successive blood samples for a particular constituent of interest. While the particular methodology for effecting such analysis does not form a part of this invention, all such methodologies have in common the introduction of a particular reagent at a predetermined volumetric flow rate into the analytical system for reacting the successive blood samples.

As shown, the "continuous-flow" system includes a source 1 of blood samples to be analyzed, which comprises a turntable 3 supporting a circular row of sample receptacles 5. Turntable 3 is periodically and intermittently indexed, by conventional means, not shown, to locate each sample receptacle 5, in turn, at an off-take position below aspirating probe 7. Aspirating probe 7 is controlled by apparatus 9 to be immersed into each receptacle 5 located, in turn, at the off-take positon to remove a volume of liquid sample therefrom during the dwell time of turn table 3. During successive immersions into successive receptacles 5 and while turntable 3 is being indexed, probe 7 is controlled by apparatus 9 to be immersed into a wash-liquid reservoir 10. Probe 7 is connected along a conduit 11 to pump tube 13 in a peristaltic-type pump 15, which includes, at least, a second pump tube 17, whose inlet end is opened to atmosphere. Conventionally, pump 15 includes a plurality of rollers, symbolically indicated at 19, which progressively occlude pump tubes 13 and 17 along their respective lengths at a fixed rate, so as to continuously aspirate fluid therethrough at a controlled volumetric rate determined by the capacity of the particular pump tube. It is evident that the composition of the fluid stream passing along conduit 11 and pump tube 13 comprises successive blood samples, each separate from the next-previous and next-successive blood samples in the stream by fixed sequences of air-wash liquid-air segments, the intervening air segment being aspirating between successive immersion of probe 7 into a sample receptacle 5 and reservoir 10. The immersion time of probe 7 into a sample receptacle 5 and wash reservoir 10 and, also, the exposure time of probe 7 to the atmosphere can be controlled to determine the respective volumes of each blood sample, wash-liquid segment, and air segment passed successively along conduit 11.

The segmented fluid stream is pumped through pump tube 13 and along conduit 21 to one input of a fitting 23. The second input of fitting 23 is connected to pump tube 17 along conduit 25. The confluence of the segmented fluid stream along conduit 21 and the air stream along conduit 25 serves to further segment each blood sample and each wash-liquid segment by air bubbles. This further segmentation of each blood sample is found to accelerate mixing of the blood sample and reagent, as hereinafter described and, also, to eliminate any possibility of contamination between successive blood samples. Actually, the presence of the air bubbles and wash liquid in the fluid stream insures a constant, continuous scrubbing and washing of the interior surface walls of the conduit along which they are passed, so as to remove any residues remaining from a previously passed liquid segment.

In "continuous-flow" analytical systems, it is essential that the reagent introduced into the system be properly proportioned with respect to the blood sample, for example, to obtain a depth of the resulting color reaction which accurately indicates the concentration of the particular constituent of interest being analyzed. Such proportioning requires precise control of the volumetric flow rate at which the reagent is introduced into the system. Obviously, pulsations in the volumetric flow rate of either the blood samples or reagent would disturb such proportioning. Since peristaltic pumping of the liquid samples is preferred in the present technology, proportioning of sample and reagent is optimized, in such event, by providing a constant volumetric flow of reagent into the system, which is well-regulated over a wide range of ambient and system variations. The reagent would be introduced into the anlytical system along conduit 27 connected to one input of fitting 29, so as to be mixed with the segmented stream flowing from fitting 23 along conduit 31 connected to the second input of fitting 29. Conventionally, the output of fitting 29 is connected along a conduit 33 to a mixing coil 35, of the type described in U. S. Pat. No. 2,933,293, issued on Apr. 19, 1960, wherein the reagent and sample liquids are thoroughly intermixed before being passed to the analytical system 37. In analytical system 37, the reagent-sample mixture, is further reacted according to the particular methodology being used by the analysis, e.g. heating, etc., and subsequently analyzed for the particular constituent of interest. The result of such analysis can be permanently recorded by a stylus-type recorder 39, as illustrated.

In accordance with the present invention, the volumetric flow rate of reagent passing along conduit 27 and, ultimately, into the analytical system 37 is precisely controlled by flow regulator 41. The reagent is initially supplied from a sealed container 43. An inert air or nitrogen, preferably gas, is supplied from gas source 45 and through pressure regulator 47 into container 43 along a gas inlet tube 49. The pressurized gas introduced along inlet tube 49 is effective to force reagent from container 43 and along fluid outlet tube 51 and conduit 53 to the flow regulator, or controller, generally indicated as 41.

Flow regulator 41 comprises a pressure-tight main housing 55, having upper and lower cap portions 57 and 59. A pair of diaphragms 61 and 63 formed, for example, of polyethylene material, are positioned between caps 59 and 57, respectively, and housing 55, as shown, the caps being attached by conventional techniques to form a pressure tight seal. Diaphragms 61 and 63 are clamped to member 65 by means of circular plates 67a and 67b, which are disposed on opposite surfaces of the diaphragms and, for example, may be connected by screws, not shown. A control seat 87 is supported on plate 67b.

Diaphragms 61 and 63 define, in effect, three distinct chambers within main housing 55, that is, a reagent inlet chamber 71, a reagent outlet chamber 73, and an intermediate chamber 75. Inlet and outlet chambers 71 and 73 are in fluid-flow communication along a fluid-resistance coil 77, as illustrated. Accordingly, reagent forced from container 43 flows along conduit 53 and through pre-heat coil 79 to inlet 81, through inlet chamber 71 and outlet 83 resistance coil 77 to inlet 85, and through outlet chamber 73, so as to pass between control seat 87 control tube 89, the latter being connected to conduit 27, above described. The flow rate through the regulator 41 is essentially unobstructed and there is no "dead-end" stagnation of the reagent, so as to allow rapid filling and rapid purging of the reagent. Such flow rate is controlled by the spacing between control seat 87 and control tube 89 and, also, the time required to cleanse the system after use.

The flow rate from regulator 41 and along conduit 27 is controlled by the spacing of the control seat 87 and the opening of control tube 89. The surface of control seat 87 and the opposing surface of control tube 89 are parallel and optically flat. A control spring 91 is located within intermediate chamber 75 to provide a reference potential PR, which tends to force the floating valve assembly upwardly from the control tube 89. As illustrated, control spring 91 is connected at one end to the base of connecting member 65 and at its other end to a horizontal arm 93 which is fixedly attached to the interior surface walls of main housing 55. The differential pressure ΔP developed across the floating valve assembly, that is, between input and output chambers 71 and 73, due to the pressure drop across high-resistance coil 77, acts against reference potential PR to position the valve assembly to establish a predetermined flow rate. In effect, the spacing between control seat 87 and the end of control tube 89 is varied and acts as a variable fluid resistor. As described, a stable condition is achieved when the pressure differential ΔP is of sufficient magnitude to position control seat 87 from the end of control tube 89 to establish a given volumetric flow rate, Q. Since flow rate Q is a function of the viscosity of the reagent, the reagent is preheated along preheat coil 79 together with flow regulator 41 by submerging in a controlled-temperature bath 95, or indicated by the dashed outline.

In operation, the reagent flowing from container 43 through the regulator 41 creates a pressure drop ΔP across resistance coil 77, which acts across the diaphragms 61 and 63 to position control seat 87 spaced from the opening of control tube 89 to maintain a desired flow rate Q. Intermediate chamber 75 is pressurized at substantially source pressure as input chamber 71, by connection to the outlet of gas regulator 47 along conduit 97 via inlet 99. Pressurization of interior chamber 75 allows for the use of very thin, chemically-resistant, flexible diaphragms 61 and 63, to minimize any hystereses during the movement of the valve assembly, while preventing any bellowing or variations in the effective areas of such diaphragms. In addition, the pressure drop ΔP is, in effect, reflected on across diaphragm 61, such that control of the flow rate is essential independent of any difference between the effective areas of diaphragms 61 and 63, resulting from manufacturing tolerances. Any transient disturbance occurring in any part of the system and resulting in a change in flow rate Q and a change in ΔP across resistance coil unbalances the forces acting in opposition to control spring 91, i.e. reference potential $P_R$. For example, any ttransient increase in the pressure $P_1$ in reagent container 45 or any transient decrease in the flow resistance along conduit 27 and beyond, would result in an increased pressure drop ΔP across resistance coil 77, whereby an excess force is available in opposition to reference potential $P_R$ to displace the control seat 87 to a new equilibrium position and reduce the spacing therebetween and the opening of control tube 89. Accordingly, the flow resistance through flow regulator 41 is increased sufficiently to re-establish the pressure drop ΔP at the designed value and normalize the system. Also, any decrease in pressure $P_1$ or any transient increase in the total flow resistance along conduit 27 and beyond, would result in a decreased ΔP across resistance 77 and a corresponding reduction in the forces acting in opposition to reference potential $P_R$. Accordingly, in such instance, the spacing between the control seat 87 and the opening of control tube 89 would be increased, so as to re-establish the desired volumetric flow rate Q, that is, pressure drop ΔP. The operation of spring member 91 is essentially flat in the region of valve operation, such that the small movements of control seat 87 do cause any significant change in the reference potential $P_R$. Accordingly, the magnitude of pressure $P_1$ and liquid head in reagent container 45 are unimportant, since the spacing between control seat 87 and control tube 89 is a function only of the pressure drop ΔP.

Figure 2:
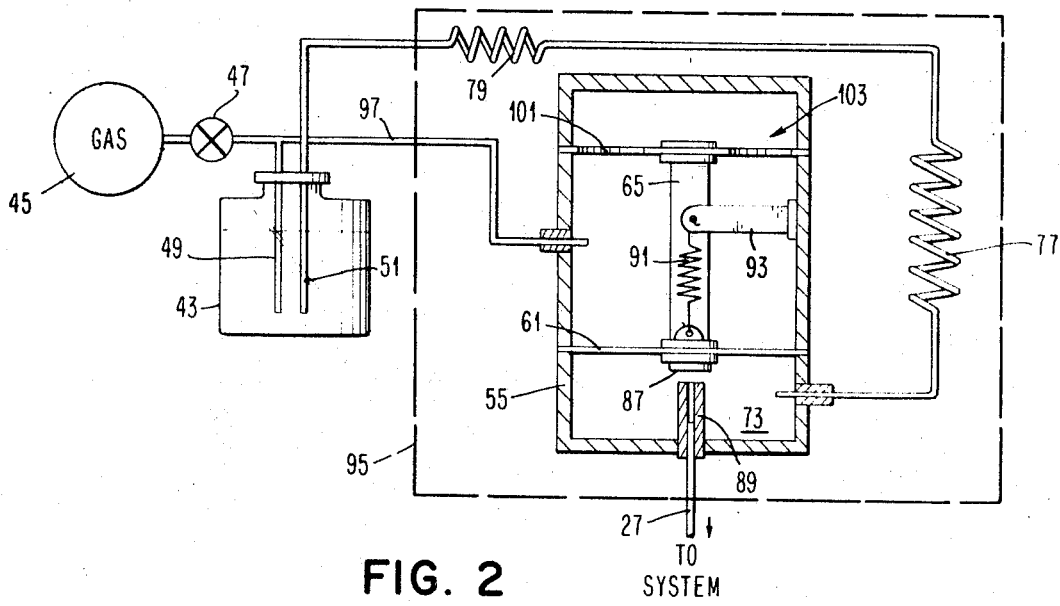
FIG. 2 shows an alternate embodiment of the flow regulator of the present invention.

An alternate embodiment of the invention is illustrated in FIG. 2, wherein like reference numbers are used to identify corresponding structures. In FIG. 2, the upper diaphragm has been replaced by a spider-like member 101, which cooperates with the membrane 61 to achieve positional stability during movement of control seat 87. In such structure, only two distinct chambers are defined in main housing 55, that is, reagent output chamber 73 and a pressurized chamber 103, which is pressurized along conduit 97 connected at the output of gas regulator 47 via inlet 99. The spider-like member 101 is connected to the connecting member 65, so as to cooperate therewith and allow uniaxial movement of the control seat 87 with respect of the opening of control tube 89, while preventing any lateral movement. Again, the showing of FIG. 2 includes the spring member 91 so as to provide the fixed reference potential $P_R$. In the alternate embodiment, the reagent forced from container 43 under pressure $P_1$ passes through preheat coil 79 and directly to resistance coil 77 and into output chamber 73. Again, the volumetric flow rate Q along conduit 27 is determined by the spacing between the control seat 87 and the opening of control tube 89. However, such spacing of the valve seat 87 is determined by the pressure differential ΔP across the diaphragm 61. Since chamber 103 is maintained at pressure P, along conduit 97, any variation in the pressure drop ΔP across high-resistance coil 77, as hereinabove described, and reflected across diaphragm 61 to effect a corresponding displacement of control seat 87 to re-establish the desired volumetric flow rate of the reagent along conduit 27.

Since chamber 103 is connected at the output of regulator 47, pressure therein is dependent upon the liquid head in container 43. Accordingly, a Marriott bottle, as shown, is employed to render the showing of FIG. 2 substantially independent of the position of the quantity of liquid, i.e. the liquid head, in container 43. As known, a Marriott bottle is characterized as one where the gas inlet tube and the fluid outlet tube, therein, 49 and 51, extend to a same level.

In each of the showings of FIGS. 1 and 2, the movement of the control seat 87 to re-establish the volumetric flow rate Q, as determined by the reference potential $P_R$, is very small, thereby permitting very rapid compensation of any disturbance in the volumetric flow rate Q along the system. Significantly, the reagent chambers in each showing are unobstructed and flow therethrough is continuous which allows for rapid purging of all entrapped air or liquids, whereby start-up is essentially immediate, once the temperature of the reagent has been established by the preheat coil 79 and bath 95 to maintain a constant viscosity through the flow regulator proper. Moreover, all materials in the flow portion of flow regulator 41 can be made of corrosion-resistant materials, so as to allow its use with even the most corrosive chemicals.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A flow regulator apparatus comprising, housing means, control plate means and control tube means, said control plate means and said control tube means being spaced such that liquid flow through said apparatus is controlled, said control plate means being supported in said housing means for relative movement along a single axis, said control plate means being moveable along said axis and being formed in elongated fashion, means for supporting said control plate means at, at least, two spaced points along its length, so as to allow relative movement along said axis, said support means including diaphragm means connected to one of said spaced points and defining at least two distinct chambers within said housing means, said control plate means and said control tube means being located in one of said chambers, means for passing liquid under a substantially constant pressure through said one chamber and between said control plate means and said control tube, and means responsive to variation in the flow rate of said passed liquid for varying said spacing, said varying means including a fluidic resistance coil in fluid flow communication with said one chamber and said control tube means, means in the other of said chambers for applying a reference pressure of predetermined magnitude to displace said control seat means from said control tube means, the pressure drop developed across said fluidic resistance coil acting in opposition to said reference pressure for displacing said control seat means toward said control tube means, means for introducing a gaseous medium into said another chamber to pressurize said another chamber at said substantially constant pressure, and temperature means for maintaining, at least, the viscosity of the liquid flowing along said fluidic resistance coil and along the spacing between said control plate means and said control seat means substantially constant.

2. A flow regulator apparatus comprising housing means, valve assembly means formed in elongated fashion and disposed within said housing, flexible diaphragm means defining, at least, a first chamber and a second chamber within said housing, control plate means supported by said assembly means within said first chamber, control tube means extending from said first chamber and juxtapositioned with respect to said control plate means, so as to define a spacing for the passage of fluid therebetween, said assembly means extending into said second chamber, and means including said diaphragm means for supporting said assembly means at, at least, two spaced points along its length, so as to provide positional stability to said control plate means when moved in respect to said control tube means, means for establishing a reference potential to space said control plate means from said control tube means, said control tube means and said tubular housing means being aligned along an axis, and said supporting means being operative to support said assembly means and, hence, said control plate means for movement substantially only along said axis, means for passing liquid along a flow path including said control tube means and said first chamber, said flow path further including a fixed fluidic resistance coil in flow communication with said first chamber for developing a pressure drop in response to the flow rate of said liquid passing therethrough and acting in opposition to said reference potential, means for supplying said liquid along said flow path at a first pressure, and means for admitting a gaseous medium into said second chamber to pressurize said second chamber at substantially a same pressure as said first pressure, and temperature means for maintaining the viscosity of said fluid along said flow path and along said fluidic resistance coil substantially constant.

3. A flow regulator apparatus as defined in claim 2 wherein said supplying means includes a Marriott-type bottle.

4. A flow regulator apparatus as defined in claim 2 wherein said supplying means includes a sealed container, means for pressurizing said container to said first pressure, so as to pass said fluid along said flow path at said first path, and means for connecting said pressurizing means to said second chamber, so as to admit pressure into and maintain said second chamber at substantially a same pressure as said first pressure.

* * * * *